United States Patent
Kermani

(10) Patent No.: US 6,567,506 B1
(45) Date of Patent: May 20, 2003

(54) TELEPHONE NUMBER RECOGNITION OF SPOKEN TELEPHONE NUMBER IN A VOICE MESSAGE STORED IN A VOICE MESSAGING SYSTEM

(75) Inventor: Bahram Ghaffarzadeh Kermani, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/453,025

(22) Filed: Dec. 2, 1999

(51) Int. Cl.[7] .............................................. H04M 1/64
(52) U.S. Cl. ............................. 379/88.01; 379/88.08; 379/88.22; 704/200
(58) Field of Search .......................... 379/88.01, 88.04, 379/88.07, 88.08, 88.09, 88.11, 88.19–88.23, 88.26–88.28; 704/200, 231, 234, 243, 251, 254, 260, 270, 270.1, 275

(56) References Cited

U.S. PATENT DOCUMENTS

| | | | | |
|---|---|---|---|---|
| 5,163,082 A | * | 11/1992 | Karnowski | 379/88.01 |
| 5,504,805 A | * | 4/1996 | Lee | 379/142.17 |
| 5,651,056 A | * | 7/1997 | Eting et al. | 379/216.01 |
| 5,708,698 A | * | 1/1998 | Akahane | 379/67.1 |
| 5,768,349 A | * | 6/1998 | Knuth et al. | 379/73 |
| 5,848,130 A | * | 12/1998 | Rochkind | 379/67.1 |
| 5,960,447 A | * | 9/1999 | Holt et al. | 704/235 |
| 6,035,017 A | * | 3/2000 | Fenton et al. | 379/88.04 |
| 6,219,407 B1 | * | 4/2001 | Kanevsky et al. | 379/67.1 |
| 6,249,765 B1 | * | 6/2001 | Adler et al. | 379/88.03 |
| 6,266,400 B1 | * | 7/2001 | Castagna | 379/88.2 |
| 6,396,906 B1 | * | 5/2002 | Kaplan | 379/209.01 |

* cited by examiner

Primary Examiner—Fan Tsang
Assistant Examiner—Roland G. Foster
(74) Attorney, Agent, or Firm—William H. Bollman

(57) ABSTRACT

A voice messaging system such as a telephone answering device which allows automatic identification and tagging of a voice clip portion of a full voice message which contains a spoken telephone number (e.g., a call back number). The voice clip may be tagged for later playback separate from playback of the full voice message. The full voice message may be deleted, leaving just the voice clip portion containing the spoken telephone number. The spoken telephone number may be processed through an appropriate voice recognition application program to generate textual information regarding the spoken telephone numbers, which may then be displayed. Call related information such as Caller ID information may be displayed together with the displayed textual voice clip information. The voice clip portions of the full voice message may be identified either in substantially real-time, or off-line during periods of non-use of the telephone answering device.

14 Claims, 10 Drawing Sheets

MESSAGE TABLE SECTOR

360

VOICE CLIP SPEECH DATA SECTOR

FIG. 10
MESSAGE TABLE SECTOR
PRIOR ART
800

| | |
|---|---|
| 802 | TIME/DATE |
| 804 | TAG |
| 806 | CODER |
| 808 | NEW/OLD |
| 810 | DELETED/NON-DELETED |
| 812 | # BYTES IN LAST SECTOR |
| 814 | LINK LIST |
| 816 | ETC. |

FIG. 11
SPEECH DATA SECTOR
PRIOR ART
900

| | | | |
|---|---|---|---|
| 902 | ENCODED SPEECH DATA | 0 | (0) |
| 904 | ENCODED SPEECH DATA | 1 | |
| 906 | ENCODED SPEECH DATA | 2 | |
| | ⋮ | ⋮ | |
| 908 | ENCODED SPEECH DATA | 127 | (7F) |

US 6,567,506 B1

TELEPHONE NUMBER RECOGNITION OF SPOKEN TELEPHONE NUMBER IN A VOICE MESSAGE STORED IN A VOICE MESSAGING SYSTEM

BACKGROUND OF THE INVENTION

1. Field of the Invention

This invention relates generally to voice messaging systems. More particularly, it relates to a voice messaging system such as a telephone answering device capable of identifying a portion of a voice message containing a spoken telephone number.

2. Background of Related Art

Voice messaging systems in general, and telephone answering devices (i.e., answering machines) in particular, are useful devices for the home or office. A conventional telephone answering device operates on a single telephone line and answers an incoming call to an unused (i.e., on-hook) or even busy telephone after a desired number of rings. The telephone answering device causes the telephone line to enter an off-hook condition, then plays an outgoing greeting message to the calling party. After the outgoing greeting message, the calling party may leave a voice message on the telephone answering device. At a later time, the voice message is replayed by the user, either local to the telephone answering device or via remote connection from another telephone.

Voice messaging in telephony has been greatly advanced in recent years by the inclusion of digital information associated with a voice message. In fact, answering or voice messaging machine designs have further benefited from the decreasing costs of non-volatile memory to the point at which digital answering machines and electronic voice mail systems are affordable and common. In these types of voice messaging systems, speech data is stored digitally, i.e., in non-volatile or volatile-with-refresh memory rather than on a magnetic tape as in older messaging machines.

FIG. 9 illustrates a conventional telephone answering device capable of answering and recording a voice message from an incoming call on a telephone line.

In particular, in FIG. 9, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 is typically a suitable microprocessor, microcontroller, or digital signal processor (DSP). The ring detect signal indicates to the controller 19 the ringing of an incoming telephone call on the telephone line 15.

After a desired number of ring signals, the telephone answering device 11 causes the telephone line interface 17 to place the telephone line in an off-hook state, and instructs a voice recorder/playback module 21 to play a pre-recorded outgoing greeting message over the telephone line 15 to the calling party. Upon completion of the outgoing greeting message, the calling party may leave a voice message in voice message memory 23 under the control of the controller 19.

A user of the telephone answering device 11 later retrieves the recorded voice message from the voice message memory, using the user control keys 25 or other buttons or controls for selecting various modes of operation, and then deletes the voice message if desired. The user control keys 25 include an alphanumeric twelve-key keypad 25a to allow the user to manually dial a telephone number and use the telephone answering device 11 as an otherwise conventional telephone (using a handset, not shown). The user control keys 25 further include voice message playback control buttons such as REW, FF, STOP, PLAY 25d, and REC.

In addition, voice messages may be deleted using a delete message button 25c or other appropriate control. When deleted, the entire voice message is effectively erased from the voice message memory 23 (e.g., by allowing new voice messages to overwrite all portions of the deleted voice message).

A voice message number display 200 indicates a sequential message number, e.g., 1, 2, 3 . . . . The voice message number display is typically one or two digits in length.

FIG. 10 illustrates an exemplary voice message table 800 contained in one sector of the voice message memory 23. The message table 800 contains various header information relating to an underlying voice message stored in the same or linked page of voice message memory 23. Conventional header type information includes a time/date stamp 802 indicating the time and date when an underlying speech message was stored. TAG information 804 in the header contains user defined data. Typically, to maximize efficiency in the conventional digital answering machine 11, the speech data is encoded. Thus, the header includes coder information 806 identifying the type of encoding used to encode the underlying voice message data, e.g., the particular coded data rate. The new/old information 808 entry in the header of the message table 800 relates to whether or not the underlying speech message has been reviewed at least once by the user of the digital answering machine 11. The deleted/non-deleted information 810 in the header conventionally indicates whether or not the underlying voice message has been deleted by the user. The number of bytes in the last sector information 812 relates to the length of the voice message in the last sector in which the voice message is stored, avoiding replay of the unused end portion of a partially used last sector when replaying the relevant voice message. Link list information 814 in the header indicates the addresses of all sectors used to store the relevant voice message. Some systems include additional header information 816 in the message table 800.

FIG. 11 shows an exemplary sector in the voice message memory 23 containing the underlying voice message 902–908. The sector shown in FIG. 10 is the first listed in the link list 814 of the message table 800 for the underlying voice message. Zero, one or more pages of speech data 902–908 may be listed in the link list 814 of a message table 800 for a single voice message.

Unfortunately, there is limited space in the voice message memory 23 to store voice messages on a conventional telephone answering device 11. As indicated in FIG. 12, once the maximum recording time has been reached, the telephone answering device 11 will not be able to accept and record any additional voice messages. The user of the conventional telephone answering device will be required to delete or erase an entire message from the voice message memory 23 in order to receive and record additional voice messages.

Moreover, a user of a voice messaging system may occasionally receive a very long voice message. In such a case, the user may be interested in only a small portion of the very long voice message, e.g., the end portion containing a call-back telephone number. Oftentimes, a user needs to hear the general content of the voice message only once, but may not be prepared for writing down detailed information at the end, e.g., a telephone number, contact name, or an address. Using conventional telephone answering systems, the entire voice message must be retained until played back later when the user is prepared to transcribe the detailed information. Unfortunately, the retained lengthy voice message will occupy valuable memory in the limited voice message memory 23.

Accordingly, there exists a need for a method and apparatus allowing more efficient use of voice memory to provide additional capacity to store additional voice messages.

SUMMARY OF THE INVENTION

In accordance with the principles of the present invention, a device for generating a voice clip of a full voice message comprises a spoken telephone number recognizer module to review a full voice message and identify a voice clip portion of the full voice message containing a spoken telephone number. A tagging module associates the voice clip portion with the full voice message for separate playback.

A method of generating a voice clip of a spoken telephone number from a voice message comprises identifying a voice clip portion of the voice message containing a spoken telephone number. The voice clip portion of the voice message is associated with the voice message.

BRIEF DESCRIPTION OF THE DRAWINGS

Features and advantages of the present invention will become apparent to those skilled in the art from the following description with reference to the drawings, in which:

FIG. 10 illustrates a conventional sector of memory containing a conventional voice message table in the conventional telephone answering device illustrated in FIG. 9.

FIG. 11 illustrates a conventional sector of memory containing conventional speech data in the conventional telephone answering device illustrated in FIG. 9.

DETAILED DESCRIPTION OF ILLUSTRATIVE EMBODIMENTS

The present invention provides a voice messaging system, e.g., a telephone answering device, which automatically identifies a spoken telephone number in a voice message, and tags an appropriate length of the original voice message as a voice clip. According to the invention, the telephone answering device searches any one or all voice messages for the audible speaking of a telephone number within the voice message. If a spoken telephone number is identified within the voice message, a voice clip is created of the telephone number spoken in the voice message. The telephone number voice clip is tagged to the original voice message, and can be retained even if the user deletes the original full voice message. Thus, the user may delete the full voice message separate from the voice clip, leaving only the voice clip for later efficient playback of a callback telephone number without requiring re-listening to a previously reviewed voice message to obtain the call back telephone number left by the caller.

Although the present invention is shown embodied in a telephone answering device, the present invention is equally applicable to voice messaging systems in general, electronic voice mail systems, or any other memory system which associates and stores speech-related data.

Figure 1:
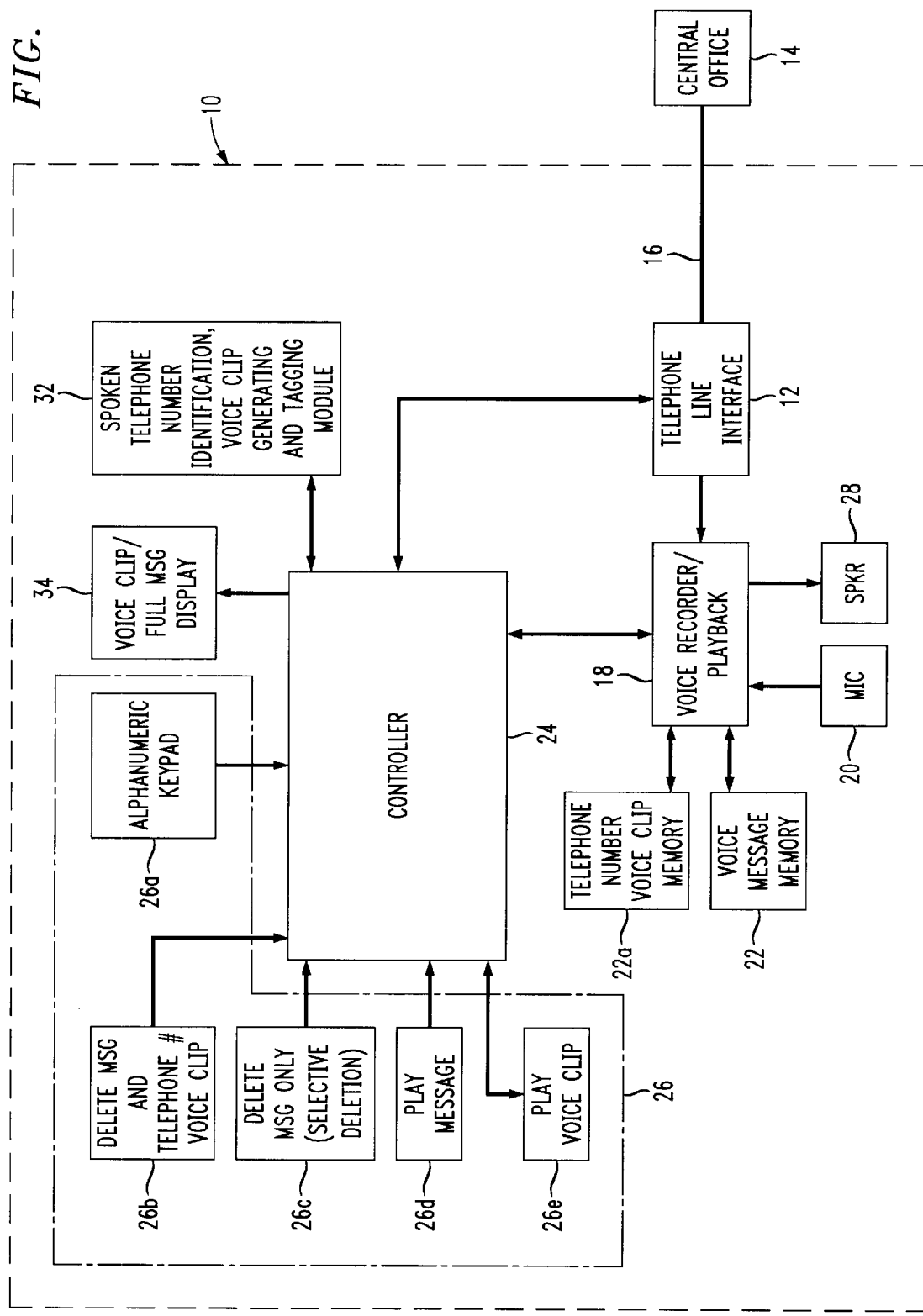
FIG. 1 shows a telephone answering device which allows a calling party to record a voice message, and which identifies a spoken telephone number voice clip portion of the voice message, for separate playback and/or deletion, in accordance with the principles of the present invention.

FIG. 1 shows a telephone answering device, indicated generally at 10, capable of identifying a spoken telephone number voice clip portion of a recorded voice message, for separate playback and/or deletion, in accordance with the principles of the present invention.

In particular, the telephone answering device 10 includes a telephone line interface 12 for interconnection with a telephone company central office 14 via a telephone line 16. The telephone line interface 12 interconnects the telephone line 16 with a voice recorder/playback module 18. The voice recorder/playback module 18 includes a microphone 20 for recording local messages and/or for recording a personalized outgoing greeting message. Recorded voice messages are stored in voice message memory 22, and are played back by the voice recorder/playback module 18 through a speaker 28 or similar device. The voice message memory 22 may be any suitable memory, preferably non-volatile memory, e.g., Flash memory.

The telephone answering device 10 includes a controller 24 to control the overall functionality of the telephone system 10. The controller 24 may be any suitable processor, e.g. a microprocessor, a digital signal processor (DSP), or a microcontroller.

A plurality of keys 26 and/or other buttons and controls allow a user to select various modes of operation, including the retrieval and playback of voice messages from the voice message memory 22. For instance, the disclosed keypad includes an alphanumeric keypad 26a to allow a user to manually dial a telephone number or otherwise cause dual tone, multiple frequency (DTMF) tones to be output on the telephone line 16.

The telephone answering device 10 includes a voice clip identification module 32 which controls processing of a recorded voice message (either real-time or off-line).

The voice clip identification module 32 processes a voice message by performing a voice recognition limited to digit recognition. The digit recognition application within the voice clip identification module 32 may be crude as compared to voice recognition systems in general in the sense that all it need do is recognize a spoken sequence of numbers and differentiate the spoken number digits from the remaining portions of the voice message.

The voice clip identification module 32 may include any suitable voice recognition software application capable of recognizing spoken digits as a minimum. For instance, commercially available voice recognition software application programs such as Dragon Dictate™ or IBM Naturally Speaking™ are capable of recognizing all portions of a spoken message, although only the portions containing spoken digits need be recognized. The voice clip identification module 32 may monitor the output of such a voice-to-text application program, and tag the portions of the full voice message corresponding to those portions including spoken digits which may be part of a telephone number.

After identification of the voice clip portion, the voice clip portion can be saved as an addendum to the original full voice message, after which the user can choose to delete the full voice message while retaining the addendum portion containing the spoken telephone number for later shortened playback.

Figure 6:
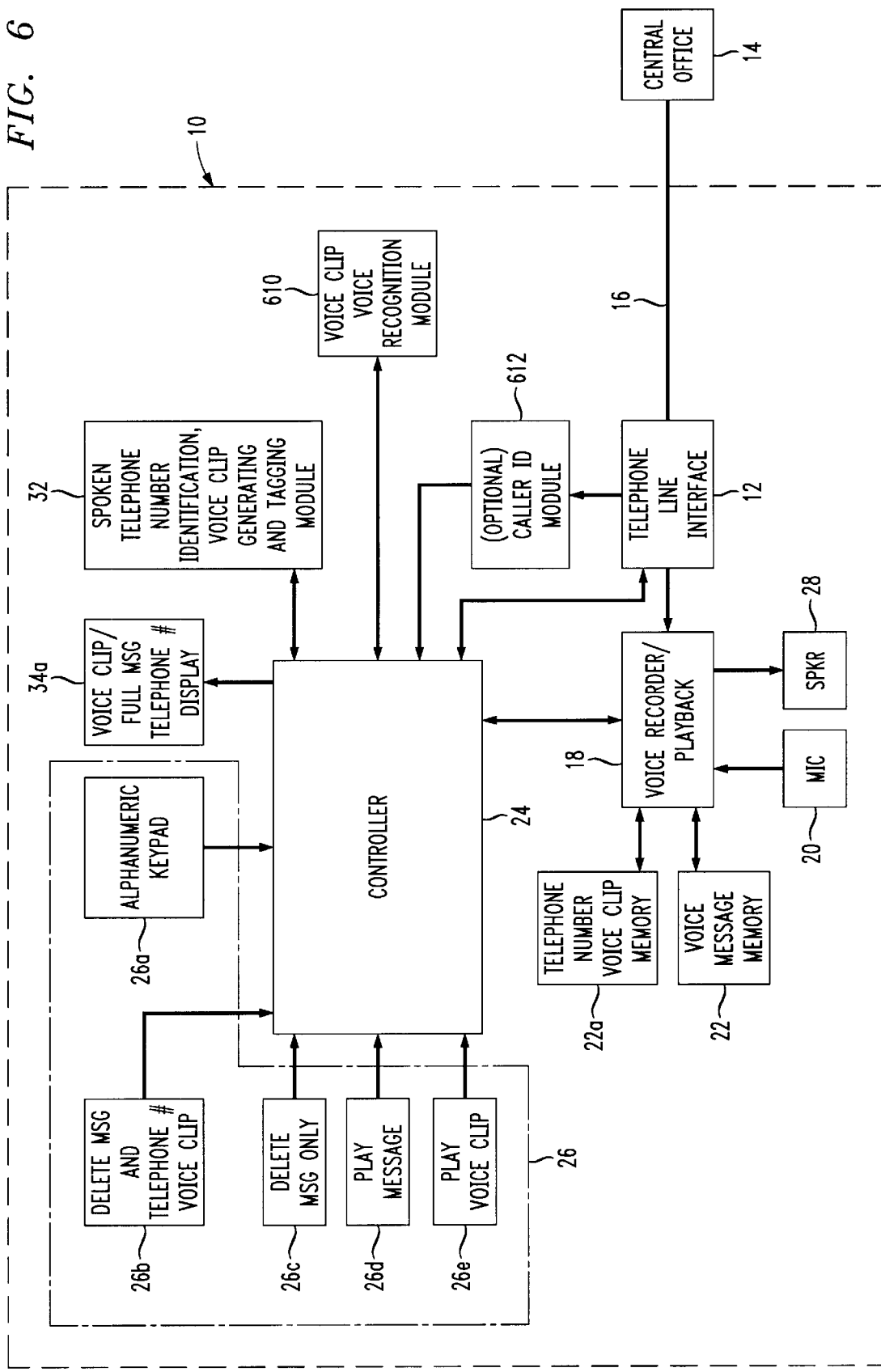
FIG. 6 is another embodiment of a telephone answering device which identifies a spoken telephone number voice clip portion of a voice message as shown in FIG. 1, but additionally converts the spoken telephone number into textual information for display, in accordance with another aspect of the principles of the present invention.
Figure 7:
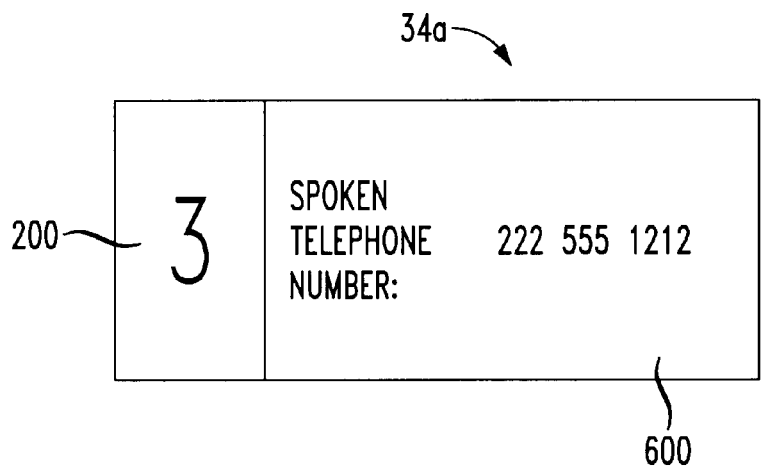
FIG. 7 is a more detailed diagram of an exemplary embodiment of the display shown in FIG. 6.
Figure 8:
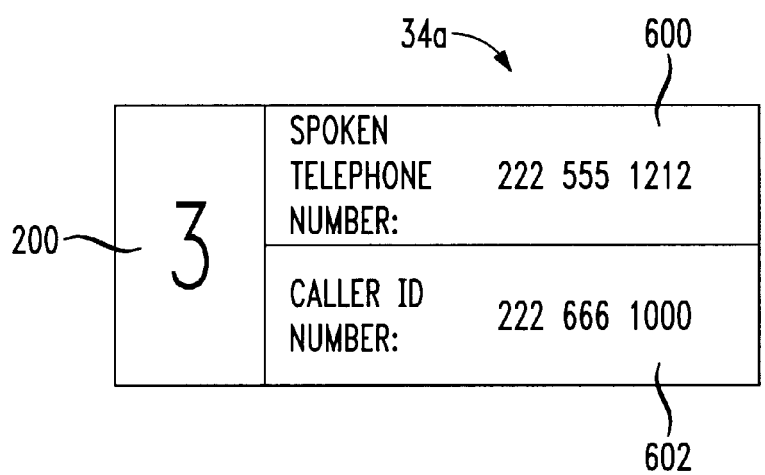
FIG. 8 is detailed diagram of another exemplary embodiment of the display shown in FIG. 6 including display of call related information such as Caller ID information.
Figure 9:
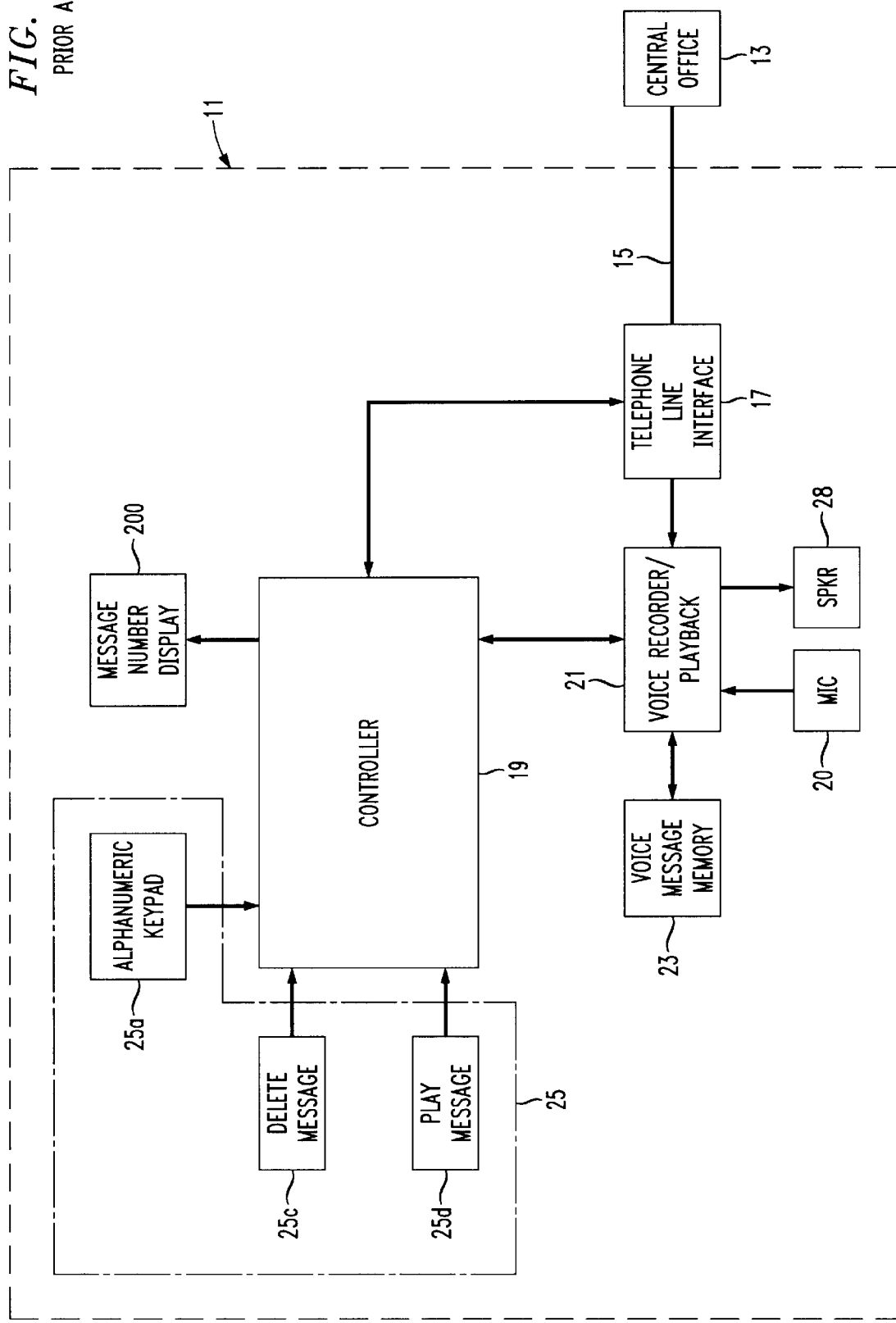
FIG. 9 illustrates a conventional telephone answering device.
Figure 12:
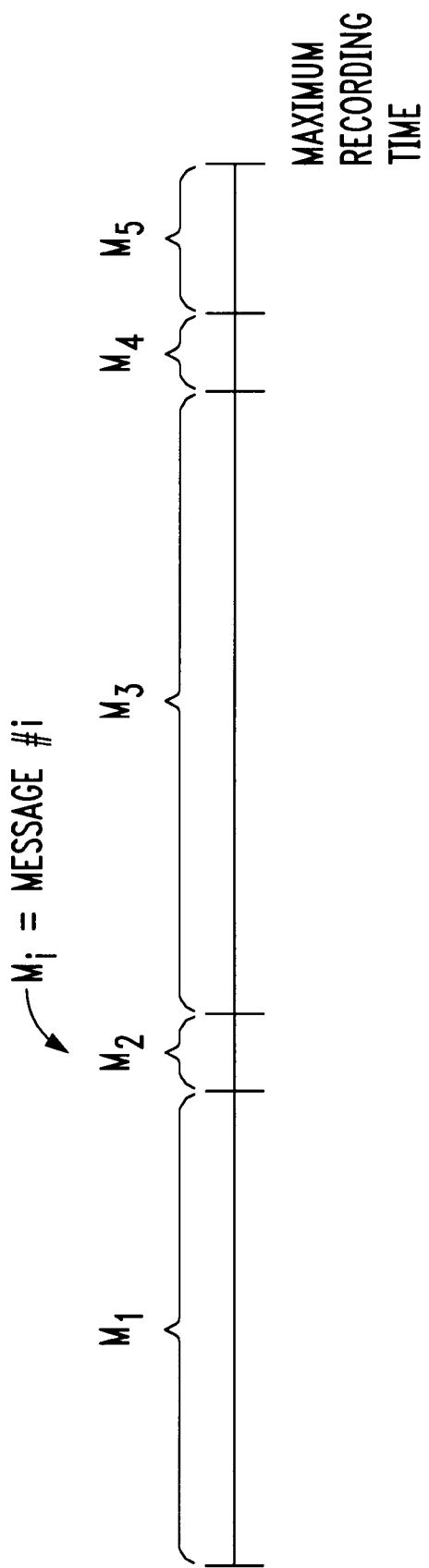
FIG. 12 illustrates exemplary contents of voice message memory of the conventional telephone answering device illustrated in FIG. 9.

While textual recognition of the spoken telephone number is a feature of an advanced embodiment of the present invention shown in FIGS. 6–8, voice-to-text conversion of the telephone number voice clip portion is not required. The present invention preferably merely separates the portion of a voice message containing a spoken telephone number from the remaining portion of the voice message, allowing deletion of the larger full message portion while retaining the short voice clip portion containing a call back telephone number of the caller.

The voice clip identification module 32 reviews a recorded voice message (e.g., stored in voice message memory 22 or as it is digitized when received), and identifies a portion (if any) which likely contains a series of digits of a telephone number. Preferably, but not necessarily, the voice clip identification module 32 tags (or identifies) a portion of a full voice message including at least a threshold number of digits, e.g., three (3) or more, as a telephone number (or extension). Of course, the threshold minimum number of digits can be extended to, e.g., seven (7) to increase the likelihood that the identified voice clip in fact contains a spoken telephone number, but at the risk of missing shorter telephone numbers (e.g., extension numbers). The minimum digit threshold may be set in an appropriate register accessible to the controller 24, and may be allowed to be configurable by the user if desired.

The telephone answering device 10 further includes telephone number voice clip memory 22a, which may or may not be included within the voice message memory 22. Preferably, the voice clip memory 22a is appropriate non-volatile memory, e.g., Flash memory.

After identification, the voice clip identification module 32 may copy the voice clip portion to another location, e.g., to telephone number voice clip memory 22a. Alternatively, the identification may simply tag a portion of a full voice message already stored in the voice message memory 22. Thus, the use of separate telephone number voice clip memory 22a is optional based on the particular design of the telephone answering device 10.

The keys 26 of the disclosed embodiment further include keys for allowing playback and deletion of recorded voice messages (in addition to other buttons not shown). For instance, the keys 26 may include a PLAY button 26d which allows playback of recorded voice messages. In accordance with the principles of the present invention, instead of a full voice message, only a voice clip portion of a full voice message may be played back for fast review of callback information. In the disclosed embodiment, a dedicated PLAY VOICE CLIP button 2e is implemented in the keys 26, although any appropriate button and/or software activation of a voice clip playback feature is within the principles of the present invention.

A display 34 displays an indication as to whether the currently queued voice message is a full voice message as received, or has been reduced down to the identified voice clip portion (or replaced by a copy of the voice clip portion).

Figure 2A:
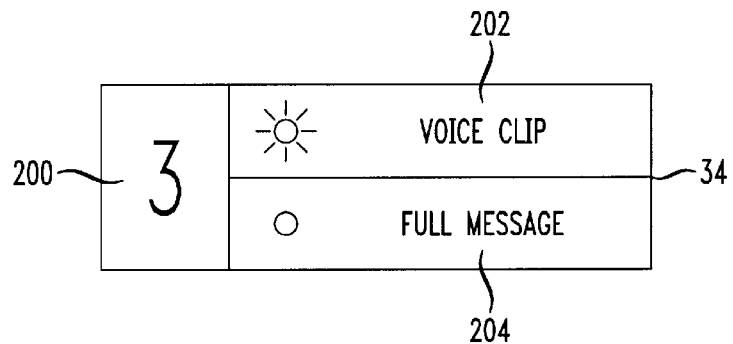
FIGS. 2A to 2C show exemplary states of the disclosed display shown in FIG. 1.
Figure 2B:
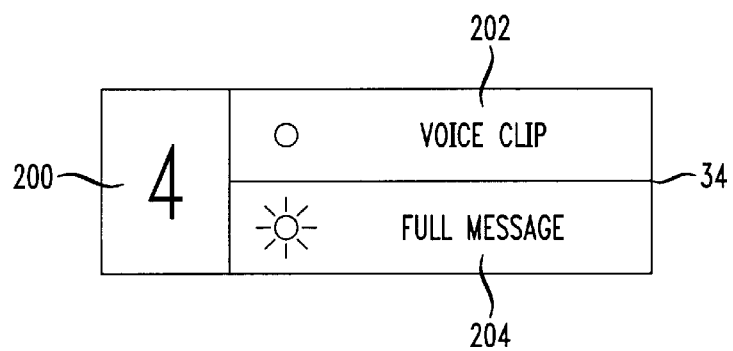
Figure 2C:
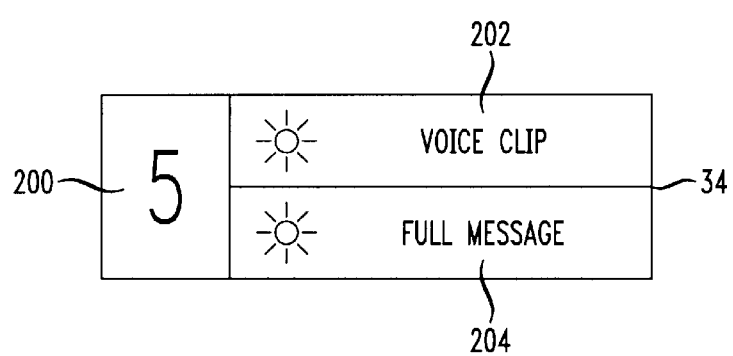

For instance, FIGS. 2A to 2C show exemplary states of the exemplary display 34 shown in FIG. 1. Of course, other displays (or no display) may be used within the principles of the present invention. FIG. 2A shows an example display 34 having voice message number "3" currently queued for playback (or currently being played back), and that the voice message number "3" corresponds only to a voice clip portion including a spoken telephone number as identified and tagged by the voice clip identification module 32. In FIG. 2A, an LED portion 202 corresponding to a voice clip indication is illuminated, while another LED portion 204 corresponding to a full voice message indication is not illuminated.

FIG. 2B shows an example wherein message number "4" corresponds to a full voice message which does include an identified telephone number voice clip portion, as indicated by the illuminated full voice message LED 204 and the extinguished voice clip indication LED 202.

Lastly, in FIG. 2C, queued message "5" corresponds both to an undeleted full voice message as indicated by the illuminated full voice message LED 204, as well as to an identified telephone number voice clip portion indicated by the illuminated voice clip LED 202. For message number "5", the voice clip can be played by activating the PLAY VOICE CLIP button 26c (FIG. 1), and the full voice message can be played by activating the PLAY full voice message button 26d (FIG. 1).

The voice clip identification module 32 allows automatic (or user directed) identification of a very important part of a voice message, i.e., the callback telephone number, and for selective deletion of the remaining portion of the full voice message. The voice clip identification module 32 is preferably a software module included within the program code of the controller 24. Of course, the voice clip identification module 32 may alternatively be implemented separate from the controller 24, but regardless, will preferably be in communication with the controller 24.

The voice clip identification module 32 can be activated by the user of the telephone answering device 10 via suitable input into the keypad 26, e.g., using a dedicated "activate voice clip identification" button or similar function. Alternatively, the identification of a telephone number portion of a single one or of a plurality of full voice messages may be activated by the controller 24 after recognition of a particular code keyed into an alphanumeric portion of the keypad 26.

To prevent accidental or unauthorized deletion of full messages, a security code can be implemented requiring the user to input a password prior to deletion of a full voice message, particularly if no voice clip portion is retained.

Figure 3A:
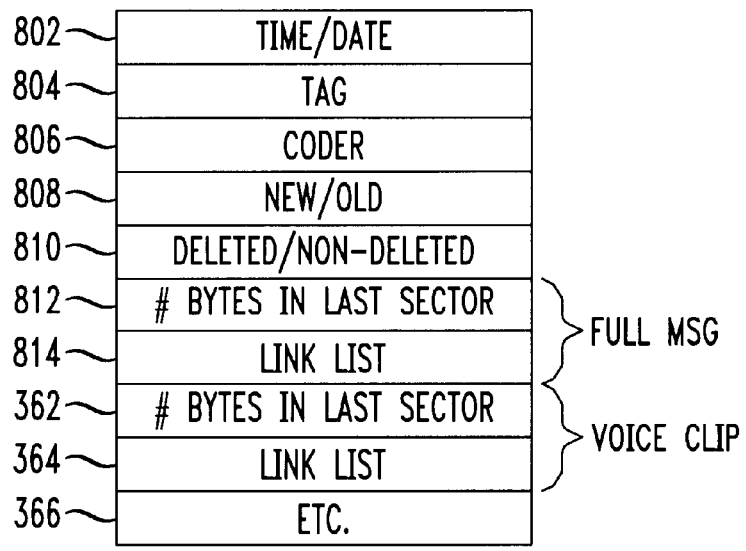
FIGS. 3A and 3B show exemplary message table sectors and voice clip speech data sectors in voice memory, in accordance with the principles of the present invention.
Figure 3B:
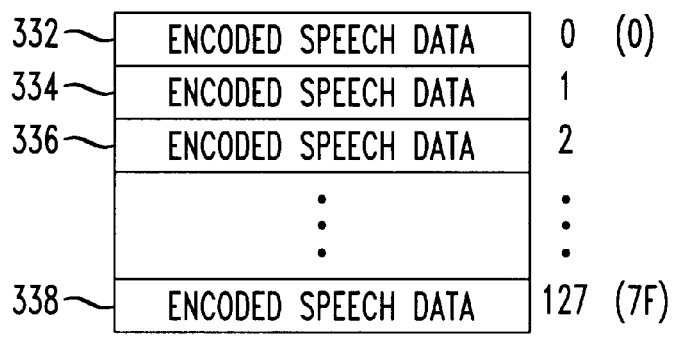

FIGS. 3A and 3B show exemplary message table sectors 360 and voice clip speech data sectors 300 in voice memory, respectively, in accordance with the principles of the present invention.

In particular, in FIG. 3A, a link list 364 corresponding to a number of voice clip speech data sectors 300 containing the identified voice clip portion may be inserted into the message table sector 360 (header) of the full voice message. In addition, to allow smooth output at the end of a voice message, the number of bytes in the last sector 362 may be included in the header. Also, if the sectors from the original full voice message are re-indexed as a voice clip, the message table sector 360 may further be revised to include a number of bytes in the first sector, to properly delineate the starting point of the voice clip. However, to simplify the identification and identification of the voice clip, the entire memory sector including a preliminary portion of a spoken telephone number may be included in the voice clip, eliminating the need to indicate a number of bytes in a first sector.

Alternatively, upon activation of the voice clip identification (e.g., upon activation of a dedicated button) instead of copying the voice clip portion of a full voice message into the telephone number voice clip memory 22a, the non-identified portion of the full voice message can be automatically removed from the voice message, leaving only the voice clip in its place. In this case, the link list 814 can be updated accordingly to no longer include the memory sectors corresponding to deleted portions of the underlying full voice message, and the blocks 362 and 364 may be eliminated from the message table sector 360 shown in FIG. 3A.

Figure 4:
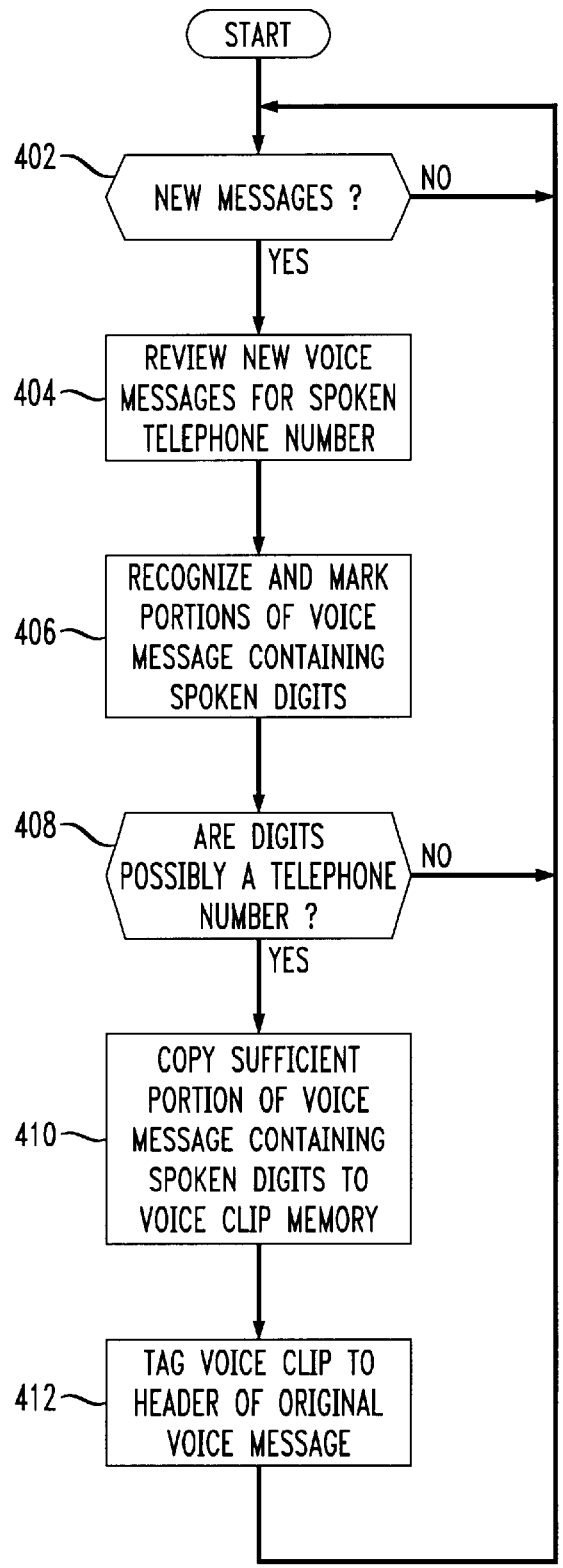
FIG. 4 is a flow chart showing an exemplary process of identifying and separately tagging a voice clip portion of a voice messaging including a spoken telephone number, in accordance with the principles of the present invention.

FIG. 4 is a flow chart showing an exemplary process of identifying and separately tagging a voice clip portion of a voice messaging including a spoken telephone number performed by the voice clip identification module 32, in accordance with the principles of the present invention.

In particular, in FIG. 4, in step 402, the voice clip identification module 32 determines if any new messages have been received since the last operation of the voice clip identification module 32. If one or more voice messages stored in the voice message memory 22 have not yet been reviewed by the voice clip identification module 32, then the new voice messages are reviewed by the voice clip identification module 32 for voice recognition of spoken digits as shown in step 404.

In step 406, voice recognition is performed on the new voice messages, one by one. This process is preferably performed off-line during non-use of the voice messaging system, but can be performed real-time as the voice message is received if a suitably powerful processor is used.

In each new voice message, a voice clip portion is identified as containing a spoken series of digits possibly corresponding to a telephone number as determined in step 408.

In step 410, if separate telephone number voice clip memory 22a is used, after identification, a sufficient portion of a voice clip message containing spoken digits is copied to the telephone number voice clip memory 22a.

To ensure that a sufficient voice clip portion is identified, a short amount of the voice message before the first digit is spoken and after the last digit is spoken may be included in the voice clip. For instance, a fixed amount of time of the voice message before the first digit (e.g., 1 second, 5 seconds, etc.) and/or a fixed amount of the voice message after the last digit is spoken (e.g., 1 second, 5 seconds, etc.) may be included in the voice clip portion of the full voice message.

In step 412, the voice clip portion is tagged to the header of the voice message, e.g., by including a link list in the header corresponding to the memory sectors either in voice message memory 22 or in the telephone number voice clip memory 22a which contain the voice clip portion.

Figure 5:
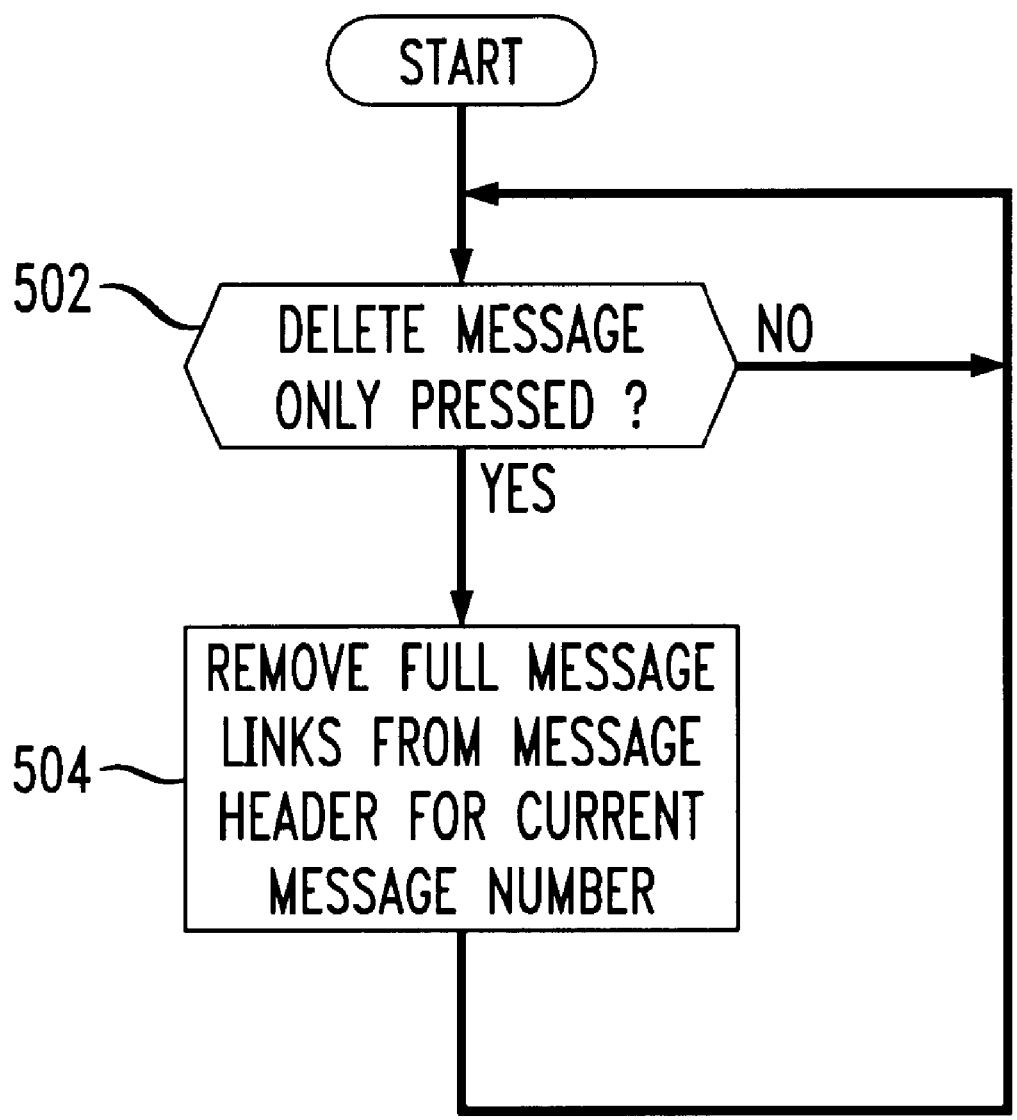
FIG. 5 shows a flow chart showing an exemplary process of deleting a voice message while leaving a tagged voice clip from that voice message including a spoken telephone number, in accordance with the principles of the present invention.

FIG. 5 shows a flow chart showing an exemplary process of deleting a full voice message while leaving a tagged voice clip from that voice message including a spoken telephone number, in accordance with the principles of the present invention.

In particular, in step 502 of FIG. 5, the controller 24 determines if the user has activated a button or other command indicating the desire to delete a full voice message without deletion of a voice clip portion, e.g., the DELETE MSG ONLY button 26c shown in FIG. 1.

If activated, step 504 performs deletion of the full voice message without deletion of the corresponding voice clip portion either by whittling the original full voice message down to the corresponding voice clip core, or if a separate voice clip portion was generated by copying, by deleting the entire full voice message leaving the copies voice clip portion intact. Thus, in step 504, the links to memory sectors which are not included in the voice clip portion, or which correspond to the full voice message portion, are removed from the message table sector 306.

FIG. 6 is another embodiment of a telephone answering device which identifies a spoken telephone number voice clip portion of a voice message as shown in FIG. 1, but additionally converts the spoken telephone number into textual information for display, in accordance with another aspect of the principles of the present invention.

In particular, FIG. 6 is similar to the embodiment shown in FIG. 1 with the exception of the inclusion of a voice clip voice recognition module 610. The voice clip voice recognition module 610 performs a voice-to-text conversion of the spoken telephone number, if possible, and displays the telephone number text on an appropriate display 34a.

FIG. 7 is a more detailed diagram of an exemplary embodiment of the display 34a shown in FIG. 6. In particular, the display 34a may display the recognized text of the spoken telephone number in a "spoken telephone number" portion 600.

FIG. 8 is detailed diagram of another exemplary embodiment of the display shown in FIG. 6 including display of call related information such as Caller ID information.

In particular, an optional call related information receiver, e.g., a CallerID receiver module 612 (FIG. 6) may be included in the telephone answering device. In such a case, received call related information such as the telephone number or name of the actual telephone used by the caller can be displayed in an appropriate portion 602 of the display 34a together with the recognized telephone number spoken by the caller in another portion 600 of the display 34a.

Thus, if call related information such as a caller's telephone number or household or business name is received by the call related information receiver 612, then that call related information (e.g., a telephone number) may be displayed in a portion 602 of the display 34a together with the recognized text of the spoken telephone number in portion 600 of the display 34a. Side-by-side comparison of the received call related information together with the recognized text of the spoken telephone number allows a user additional call back information. For instance, if the caller was at a different telephone when they left the message, the user might have a more informed perspective of the caller's location when they left the voice message.

While the invention has been described with reference to the exemplary embodiments thereof, those skilled in the art will be able to make various modifications to the described embodiments of the invention without departing from the true spirit and scope of the invention.

What is claimed is:

1. A device for generating a voice clip of a full voice message, comprising:

a spoken telephone number recognizer module to review a full voice message and identify a voice clip portion of said full voice message containing a spoken telephone number;

a tagging module to tag said voice clip portion; and a selective deletion controller to delete said full voice message but retain storage of said voice clip portion upon detection of a need to increase storage capacity, thereby allowing for later playback of only said voice clip portion.

2. The device for generating a voice clip of a full voice message according to claim 1, wherein:

said tagging module associates said voice clip with said full voice message by including voice clip information in a header of said full voice message.

3. The device for generating a voice clip of a full voice message according to claim 1, wherein:

said full voice message is reviewed in substantially real-time as said full voice message is received.

4. The device for generating a voice clip of a full voice message according to claim 1, wherein:

said full voice message is reviewed off-line after said full voice message has been stored in voice message memory.

5. The device for generating a voice clip of a full voice message according to claim 1, wherein:

said selective deletion controller updates an indexing of said full voice message to eliminate memory sectors of said full voice message not including said voice clip portion.

6. The device for generating a voice clip of a full voice message according to claim 1, further comprising:

a delete full message button to activate said selective deletion controller.

7. The device for generating a voice clip of a full voice message according to claim 1, wherein:

said device is comprised in a telephone answering device.

8. A method of generating a voice clip of a spoken telephone number from a voice message, comprising:

identifying a voice clip portion of said voice message containing a spoken telephone number;

tagging said voice clip portion of said voice message to allow separate playback of said voice clip portion alone; and updating an index of said voice message to eliminate memory sectors containing voice data not included in said voice clip portion of said voice message upon detection of a need to increase storage capacity.

9. The method of generating a voice clip of a spoken telephone number from a voice message according to claim 8, further comprising:

allowing playback of said full voice message in addition to allowing playback of said voice clip portion alone.

10. The method of generating a voice clip of a spoken telephone number from a voice message according to claim 8, further comprising:

revising header information relating to said voice message to include information regarding storage of said voice clip portion in addition to information regarding storage of said voice message.

11. Apparatus for generating a voice clip of a spoken telephone number from a voice message, comprising:

means for identifying a voice clip portion of said voice message containing a spoken telephone number;

means for tagging said voice clip portion of said voice message to allow separate playback of said voice clip portion alone means for updating an index of said voice message to eliminate memory sectors containing voice data not included in said voice clip portion of said voice message upon detection of a need to increase storage capacity.

12. The apparatus for generating a voice clip of a spoken telephone number from a voice message according to claim 11, further comprising:

means for allowing playback of said full voice message in addition to allowing playback of said voice clip portion alone.

13. The apparatus for generating a voice clip of a spoken telephone number from a voice message according to claim 11, further comprising:

means for revising header information relating to said voice message to include information regarding storage of said voice clip portion in addition to information regarding storage of said voice message.

14. The apparatus for generating a voice clip of a spoken telephone number from a voice message according to claim 11, wherein:

said apparatus is comprised in a telephone answering device.

* * * * *